Patented Aug. 10, 1943

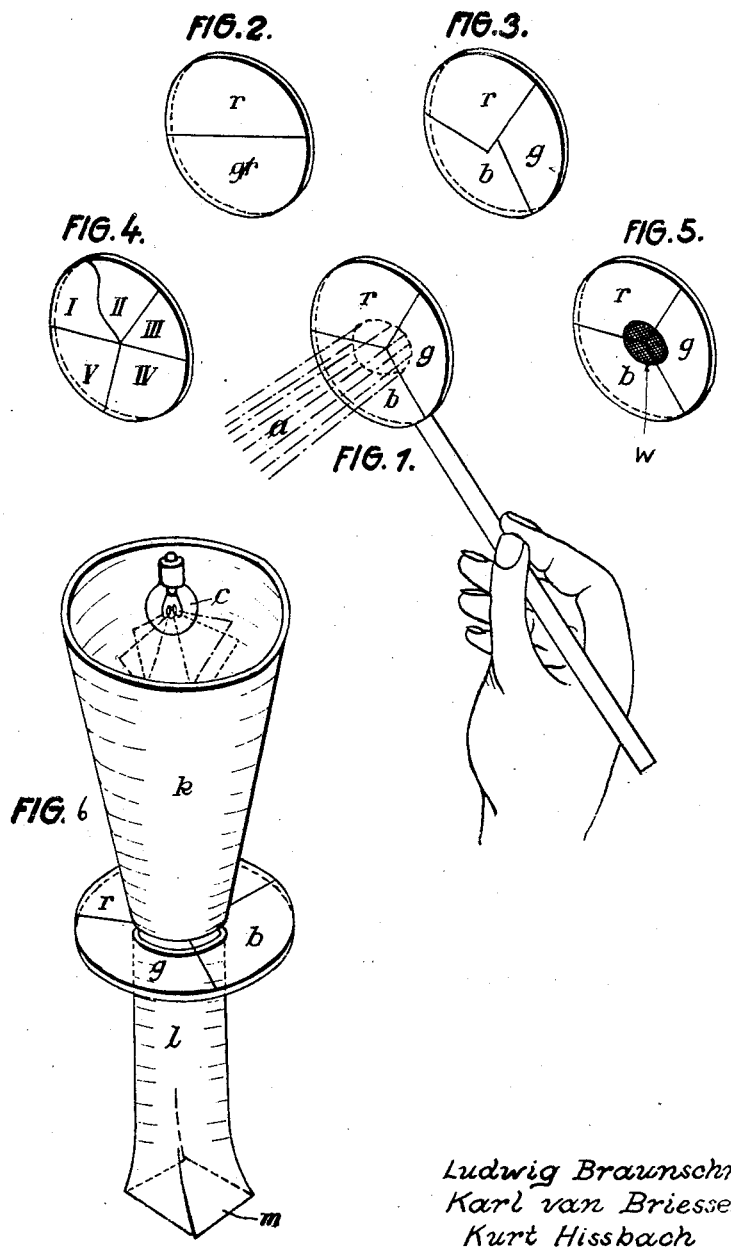

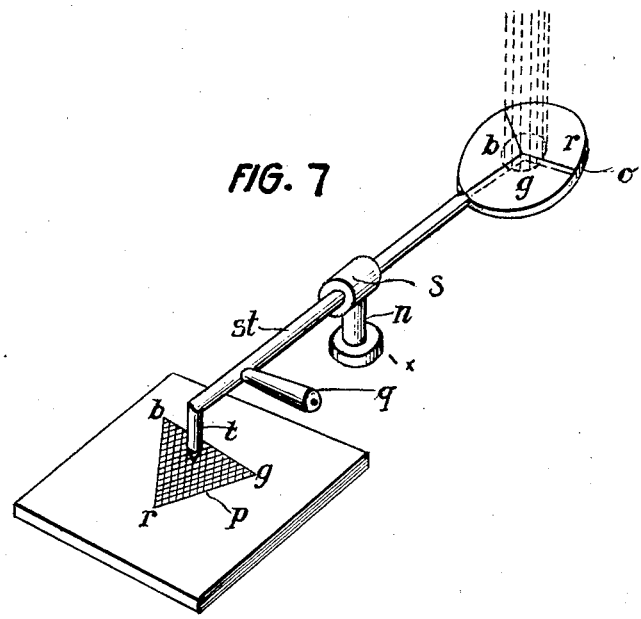
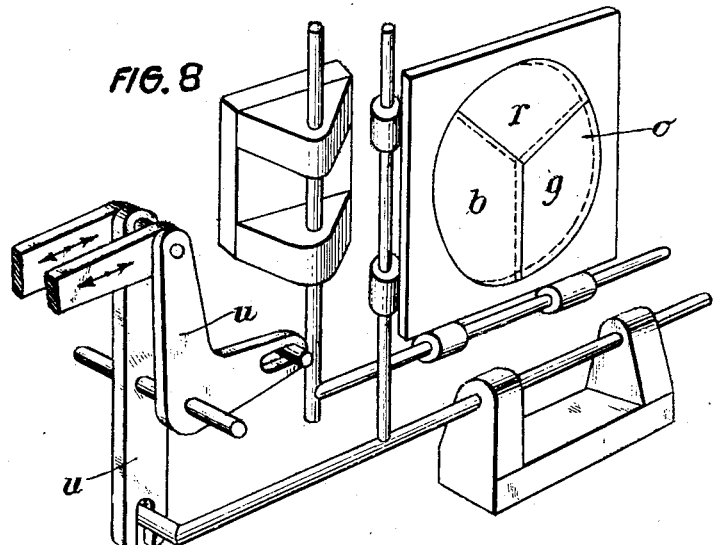

2,326,431

UNITED STATES PATENT OFFICE 2,326,431

COLOR CONTROL IN PHOTOGRAPHIC COPYING APPARATUS AND THE LIKE

Ludwig Braunschmidt, Bitterfeld, Karl van Briessen, Leipzig, and Kurt Hissbach, Wolfen, Germany, assignors to General Aniline & Film Corporation, New York, N. Y., a corporation of Delaware Application April 25, 1941, Serial No. 390,324
In Germany April 25, 1940

5 Claims. (Cl. 88—24)

Our present invention relates to an improved color control in photographic copying apparatus and the like.

In the copying of colored images and the color photography there are various methods for modifying the color tone of a source of light. As has already been proposed, the spectral composition of the beam of light may, for instance, be altered by filters preferably in the three additive or subtractive primary colors in such a manner that the light beam emanating from the source of light passes through one, two, or all three of the color filters movably arranged behind one another or that each of the three separated light beams passes through one of the three filters whereupon the light beams are mixed by suitable optical means. The control of the single color components may be effected in different ways. The color filters may, for instance, be constructed as color wedges or other means for decreasing the intensity of light such as gray wedges or diaphragms may be inserted in the path of light. Moreover, it has been suggested to employ filters built like a chess-board for the control of the hue of the beams of light. In all these methods the spectral composition of the resulting beam of light is dependent on the used color components, i. e. on at least three factors. Since the total intensity of light is modified by the change of the color of the light beam in these methods, it is moreover necessary to introduce a fourth variable factor for maintaining the intensity such as an adjustable diaphragm.

The formation of the color tone of light with three coordinates has certain disadvantages. In physiological optics it is usual to state the color and intensity by means of the so-called color triangle. Owing to the choice of the co-ordinate system one thus succeeds in clearly defining the color tone of the rays respecting size as well as direction in two dimensions while keeping the total intensity. Accordingly, if the triangular co-ordinates are converted into rectangular co-ordinates a color can exactly be defined by only two co-ordinate factors, the intensity being constant during the change of the color.

In accordance with the present invention the disadvantages of the devices previously used are overcome by rendering the combination of at least three color component filters preferably in the additive (green, red, blue) or the subtractive (yellow, purple, blue-green) primary colors and the beam of light passing through these filters shiftable in relation to one another in one and the same plane and in any direction so that the color of the light can be adjusted corresponding with the co-ordinates of a color triangle or another colorpolygon ($n$-angular). The color of the light is controlled by combined filters which make it possible to represent, adjust or regulate $n$-color components by means of $n-1$ co-ordinates on change in color tone and while maintaining the total intensity. It is not necessary that the parts of the filters are of a symmetrical shape. They may be of any form and preferably depend on the kind of the light source and the absorption curve of the filter materials used. Furthermore, it is not necessary that there is a "white point" in this system.

Reference is made to the accompanying drawings in which modifications of the apparatus according to the invention are illustrated.

Figure 1 shows a set of three filters dyed in the three additive primary colors and hit by a beam of light, Figure 2 shows a set of two filters in two primary colors, Figure 3 shows a set of three filters as in Figure 1 but in another modification, Figure 4 shows a set of five filters in different colors, Figure 5 shows a set of three filters in the three primary colors in combination with a gray filter Figure 6 shows a device for mixing colored beams of light operating without lenses, as a principle, Figure 7 shows an apparatus for mixing colored beams of light which is controlled by a color triangle and Figure 8 shows an apparatus for mixing colored beams of light which is controlled by rectangular coordinates.

The apparatus of the present invention works as follows: White light rays pass through a set of three filters $r$, $g$, $b$ (red, green, blue) in the form of sectors (angle of the center 120°) as represented in Figure 1. Each of these sectors transmits one of the three components of the white beam of light $a$. There is in this arrangement of the filters a position at which the resultant light beam is white, that is, for instance, the position at which the center of the set of the filters is in the axis of the beam of light. If the filters are shifted perpendicular to said axis, the color tone of the light beam will receive a different degree of saturation. The filters may be shifted along a chief direction so as to finally give a pure color component. It is evident to provide filters with only two color components preferably in complementary colors, for instance red and green as shown in Figure 2. Moreover, the single areas of the filters may be limited corresponding with their absorptive power and the emissive power of the used source of light in such a way that an optimum effect is obtained and the light source is controlled by shifting the filters in different directions in accordance with the preceding calculations. An example for such filters is represented in Figure 3. Furthermore, the color filters may also comprise more than three color components, for instance, the five color sectors I-V (see Figure 4) corresponding with the properties of the light source or the absorption curve of the filters. The lines separating the single areas of the filters need not be straight lines but may be curves of any form. Finally the filters may be combined with a gray filter $w$ (see Figure 5) in order to fulfill particular conditions for the light control.

The color filters are arranged in the path of light of the apparatus to be controlled at a place where an image of the filter system is not produced, as for instance, between the lenses of a condenser (compare the co-pending application Ser. No. 382,024, filed March 6, 1941) especially in parallel light rays, or in the plane of the diaphragm of the system giving an image, for example at that place where the iris diaphragm is positioned in the production of an image in black and white.

In Figure 6 a modification of an apparatus for mixing colored beams of light operating without lenses is represented as a principle. $c$ is a source of light, $k$ a cone having a reflecting inner surface, $l$ a light conduit with a reflecting inner wall, $r$, $g$, $b$ (red, green, blue) the system of the color filters, and $m$ the film gate. The light rays which have been controlled by the filter systems are mixed in the conduit $l$.

The color control of the present invention includes various technical modifications. An apparatus as shown in Figure 7 is, for instance, convenient if the color tone of the light beam is to be varied measurably and this change is to be determined in a color triangle $p$ ($bgr$). The beam of light passes through the filter system $o$ consisting of the component filters $b$, $g$, $r$ (blue, green, red) in a device as described above or a similar modification. The filter $o$ attached to a rod $st$ is shifted by a handle $q$. The rod $st$ is capable of sliding with ease in its longitudinal direction in the bearing $s$. A standard $n$ is attached to the bearing $s$. The other end of the bolt $n$ is rotatably connected to a plate $x$ so that the adjustment by the handle $q$ of the indicating member $t$ represents a geometrically similar movement of the filter system $o$. Each point of the color triangle $p$ corresponds with only one position of the filter system. The color tone of the saturation of the beam of light, therefore, can exactly be controlled by the adjustment in the color triangle $p$.

Another modification of the color control in accordance with the invention is shown in Figure 8. In this device the triangular co-ordinates are also converted into rectangular co-ordinates so that the three color components are determined only by two controlling components while maintaining the total intensity. The filter combination $o$ ($r$, $g$, $b$) is shifted by the levers $u$. These levers may be operated by hand and adjusted on exact scale values or regulated by controlling strips. The apparatus shown in Figure 8 is, for instance, a modification suitable for the control in color copying machines.

We claim:

1. A device for controlling the spectral composition of the light beam in photographic copying apparatus, color measuring instruments and the like comprising a support, a rod and bearing system mounted on said support and adapted for relative movement between the elements thereof in the same plane in any direction, a filter combination containing at least three filters in different colors rigidly attached to said rod and bearing system, a light source for impinging a light beam on said filter combination, means for effecting such relative movement between the elements of said rod and bearing system to shift the filter combination in relation to said light beam in the same plane in any direction, a color indicator and means carried by said rod and bearing system and co-operating with said color indicator to designate the extent to which said filter combination should be shifted.

2. The device as defined in claim 1, wherein said color indicator is a color triangle.

3. The device as defined in claim 1 including an outwardly tapering cone having a reflecting inner surface for directing said light beam to said filter combination.

4. A device for controlling the spectral composition of the light beam used in photographic copying apparatus, color measuring devices and the like, comprising a support, a standard rotatably mounted on said support, a bearing fixed to said standard, a rod mounted for longitudinal movement in said bearing, a filter combination containing at least three filters in different colors fixed to one end of said rod, means for causing a beam of light to impinge on said filter combination, means for moving said rod to shift said filter combination with respect to said light beam in the same plane in any direction, an indicator fixed to the end of the rod opposite to that to which said filter combination is attached and color indicating means co-operating with said indicator to designate the extent to which said filter combination should be shifted.

5. A device for controlling the spectral composition of the light beam used in photographic copying apparatus, color measuring devices and the like, comprising a support, a first means journaled in said support and adapted for reciprocation therein, a stand rigidly attached to and projecting from said first means, a bearing for said standard adapted for movement relative to said standard in a direction longitudinally of said standard, a second support, a second means adapted for reciprocation in said support in a direction at right angles to the direction of reciprocation of said first means, a standard rigidly carried by said second means, a bearing for said standard adapted for movement relative to said standard in a direction longitudinally of said standard, a filter combination containing at least three filters in different colors fixed to each of said bearings, means connected with said second means for causing movement thereof and its associated standard and relative movement between said first standard and the bearing associated therewith, independent means for causing movement of said first means and its associated standard and relative movement between said second standard and the bearing associated therewith, a color indicator and means carried by the filter combination and co-operating with said indicator to designate the extent to which said filter combination should be shifted.

LUDWIG BRAUNSCHMIDT.
KARL van BRIESSEN.
KURT HISSBACH.